United States Patent [19]

Chorley et al.

[11] Patent Number: 4,634,807
[45] Date of Patent: Jan. 6, 1987

[54] SOFTWARE PROTECTION DEVICE

[75] Inventors: Bernard J. Chorley, Hampton; Graeme I. P. Parkin, London; Brian A. Wichmann, Woking; Simon M. Elsom, Feltham, all of England

[73] Assignee: National Research Development Corp., London, England

[21] Appl. No.: 768,717

[22] Filed: Aug. 23, 1985

[30] Foreign Application Priority Data

Aug. 23, 1984 [GB] United Kingdom ................. 8421418

[51] Int. Cl.$^4$ ................................................ H04L 9/02
[52] U.S. Cl. ............................... 178/22.08; 178/22.11; 178/22.16
[58] Field of Search ............... 178/22.08, 22.09, 22.19, 178/22.07, 22.11, 22.16; 364/200, 900

[56] References Cited

U.S. PATENT DOCUMENTS

| | | | |
|---|---|---|---|
| 4,195,200 | 3/1980 | Feistel ................... | 364/900 |
| 4,262,329 | 4/1981 | Bright et al. ............ | 364/200 |
| 4,332,009 | 5/1982 | Gerson .................... | 364/200 |
| 4,352,952 | 10/1982 | Boone et al. ........... | 364/200 |
| 4,465,901 | 8/1984 | Best ......................... | 364/200 |
| 4,558,176 | 12/1985 | Arnold et al. ........... | 364/900 |

FOREIGN PATENT DOCUMENTS

A2109504 5/1984 European Pat. Off. .
A2136155 4/1985 European Pat. Off. .
A1831848 5/1983 World Int. Prop. O. .
2119978 11/1983 United Kingdom .
2129586 5/1984 United Kingdom .

Primary Examiner—Gareth D. Shaw
Assistant Examiner—John G. Mills, III
Attorney, Agent, or Firm—Cushman, Darby & Cushman

[57] ABSTRACT

In order to prevent the unauthorized copying of software, a software module is encrypted using the data encryption standard (DES) algorithm, and the key is encrypted using the public key of a public/private key algorithm. To use the module it is entered into a software protection device where the private key held in a RAM 11 is used by a processor 13 to decode the DES key using instructions held in a ROM 12. Further instructions held by this ROM are used by the processor 13 to decode the module. Once the process of decoding keys and software has started, the processor 13 runs through a sequence of predetermined instructions and cannot be interrupted (except by switching off). When the sequence is complete processor 13, or for example a host computer 30, is enabled to use the decoded software, but a switch/reset circuit 17 operates preventing access to the RAM 11 and the ROM 12 so preserving the secrecy of the private key and any decoded DES key which is now stored in the RAM 11.

12 Claims, 2 Drawing Figures

SOFTWARE PROTECTION DEVICE

The present invention relates to apparatus and methods of protecting software.

The threat of widespread unauthorised copying or 'piracy' has led to many software suppliers incorporating measures into their software packages designed to prevent their unauthorised copying and/or use. Such measures include tying a software product to an uncopiable peripheral device. In many such schemes the peripheral device contains a serial number, repeatedly checked by the software in processing. The circuitry of the peripheral device may be encapsulated in epoxy resin to prevent an intruder gaining physical access to the device. Such devices are sometimes termed "dongles". There are many variations of this general technqiue. Alternatively, the normal format in which software is supplied predominantly on floppy disks, is changed to prevent unauthorised loading of the software into a computer's memory. Use of such protected software requires a temporary modification of the read algorithm of the user's disk operating system. However, the security provided by most software protection schemes currently available is weak since at some stage in processing the software is stored in a plain text form in a user's insecure random access memory (RAM) and the software is run on an insecure processor. Such persons as unscrupulous users, dealers and employees of a software supplier can easily gain access to the RAM and therefore to this version of the software. Thus they have the capability of patching, or otherwise modifying, instructions to a "dongle", "watermark" or other software protection method used. An exception is a method in which software is stored in an encrypted form in a user's insecure storage and decrypted and run within a secure processor designed to prevent an intruder from having access to the software and particularly to keys used to encrypt and decrypt it. However this known method has a number of disadvantages which include operating system dependence and the need to store the whole of a software product in encrypted form in the user's insecure RAM. The implication is that the whole product must be decrypted and run within the secure processor, thus making minimal use of a host machine's processing power. Furthermore, some such methods provide at best a moderate level of security. An intruder could, for example, load software into the secure processor, the software being designed to disclose the keys or other sensitive information stored within it.

According to a first aspect of the present invention there is provided apparatus for use in protecting software comprising
- first storage means adapted to contain at least one decryption key,
- second storage means containing instructions for decrypting another key using a key held in the first storage means and for decrypting encrypted software using the said other key,
- a processor for carrying out the instructions held by the second storage means, and
- switch means having first and second modes in which the first storage means are, and are not, in communication with the processor, respectively,
- the switch means being constructed to enter its first mode automatically under predetermined conditions and while in this first mode to cause the processor to execute a sequence of the instructions held in the second storage means which end with an instruction which causes the switch means to enter its second mode,
- the first and second storage means, the processor and the switch means being contained in a tamper resistant housing, and the apparauts including an interface constructed to allow the processor to communicate with other apparatus external to the housing.

Apparatus according to the invention is referred to as a software protection device (SPD) in the remainder of this specification.

Preferably the housing also includes third storage means for storing decrypted software, the third storage means being in communication with the processor in both first and second modes. It is also usually advantageous for the second storage means to be in communcation with the processor in the first mode.

The predetermined conditions usually include switching the SPD into an operational mode for use with a host computer.

In order to protect a software package, an important module of the software is encrypted using, for example, the algorithm of the data encryption standard (DES) and a DES key. Both are also required to decrypt the module. The key is encrypted using a different technique, and in particular a public-key algorithm such as the RSA scheme, together with the RSA public-key of a public/private key pair. (These terms are explained below). The use of a public-key method provides a secure method of distributing the DES key. The corresponding secret key is held securely in the first storage means of an SPD. When the secure module is received by the SPD the secret key is used to decrypt the DES key which is then used to decrypt the secure module and this module is stored in the third storage means. The SPD processor and the host computer may then operate in series or parallel to run the software but the SPD is so arranged that the secret key, the DES key and, usually, the decoded module cannot be obtained from the SPD.

An advantage of the invention is that a plaintext version of the module and the keys used to decrypt it are protected from access by a host computer connected to the apparatus, yet the module can be run on the SPD processor as and when required by the host computer software. A further advantage is that when the SPD operates in its second mode executing the secure module, the module does not have access to SPD storage containing the decryption algorithms, secret key and DES keys, thereby defeating software-based attacks on the SPD.

Since the SPD processor can, in the second mode, be operated by an operating system in a host computer and not as a replacement for the host computer, only a single, but important, module of any software package needs to be encrypted in order to protect the whole package. This has the advantage that speed of operation is not significantly reduced since most of the software runs on the host computer. Further, as has been mentioned, the host computer and the processor may be operated in parallel. However, the choice of module affects the level of security the invention provides, for it determines the ease or difficulty with which the intruder can construct an emulation of the module. Thus in order to provide a high level of security, the functions of the chosen module must not be easily deduced from the unencrypted portion of the package. Another advantage of the invention is that both the SPD and the software are operating system independent. The protected module simply forms part of a software package and may be in a language common to all such packages. The unencrypted part of the software is tailored to run on a particular operating system, this part being changed as required for different operating systems.

A description of the DES is given in Federal Information Processing Standard, No. 46, US National Bureau of Standards, 15th Jan. 1977. As mentioned previously, the DES key used to encrypt a message must also be used in decrypting it. On the other hand, a public-key system is one in which encryption can be carried out using one key, but decryption is carried out using a different key. Knowledge of the encryption key, a plaintext message and its corresponding encrypted text does not, in practice, determine the key used to decrypt the ciphertext, and therefore publishing the encryption key does not significantly decrease the security of its corresponding secret decryption key. A suitable public-key technique for use in protecting software is described in "A method of obtianing digital signatures and public-key cryptosystems" by R. L. Rivest, A. Shamir and L. Adleman, published in Communications of the Assoication of Computing Machinery, Vol. 21, No. 2 (February 1978), the RSA public-key encryption system.

The first storage means, after sale to a user, contains his secret decryption key (which is not known to him). When encrypted software is entered, the processor decrypts the DES key and usually also stores it in the first storage means.

The first storage means may include a RAM powered from a battery by way of a connection which is broken if an attempt is made to enter the tamper-resistant housing. As an alternative or in addition means may be included in the apparatus to overwrite the contents of the RAM if an attempt is made to enter the housing.

The second storage means is preferably a read only memory (ROM) containing software for decoding the encrypted DES key and the encrypted module.

A clock also powered by the battery and available to the processor only in the first mode may advantageously be provided so that instructions may be held in the ROM to allow the software to be run only if it contains a date earlier than the current date held by the clock.

Many forms of tamper-resistant housing are known and some of these are discussed below.

According to a second aspect of the present invention there is provided a method for use in protecting software comprising the steps of passing encrypted software from a host computer to third storage means contained in a tamper-resistant housing;

decrypting the encrypted software using at least one decryption key contained in first storage means, instructions contained in second storage means and a processor, the first storage means second storage means and the processor being contained in the tamper-resistant housing;

isolating the first storage means from the processor automatically under predetermined conditions, and executing the decrypted software on the processor under control of the host computer.

Certain embodiments of the invention will now be described by way of example, with reference to the accompanying drawings in which.

Figure 1:
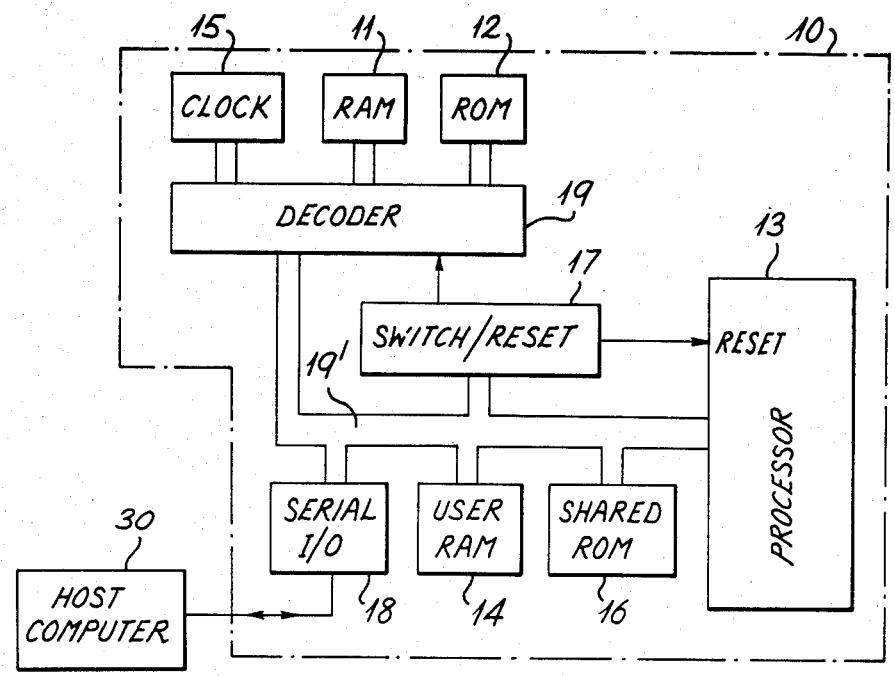
FIG. 1 is a block diagram of apparatus according to the invention.

In FIG. 1 an SPD 10 comprises a RAM 11 which in operation holds the user's secret RSA key and any DES keys which have been decrypted. The RAM 11 is supplied by a battery (not shown) by way of a connection which is broken if an attempt is made to break into a tamper-proof housing for the SPD 10. Additionally arrangements may be made to overwrite the RAM if an attempt is made to enter the housing.

The secret key is entered in a conventional way during manufacture but the connections used are internal to the housing and are not available after the housing is sealed and the SPD is issued. Alternatively the secret key may be entered after manufacture but connections allowing the key to be entered are destroyed internally (for example by fusing) after entry. The DES keys form part of encrypted software modules and may be entered when software is used.

A ROM 12 contains the software to decode DES keys using the secret key and then to decrypt encrypted software. Since algorithms for these processes are known they are not described here. Decryption is carried out by a processor 13 within the module and any decrypted DES keys are placed within the RAM 11 in numbered slots which are allocated for this purpose. The encrypted module is preferably decrypted using the Cipher Block Chaining mode of the DES, although the invention could equally be applied in other modes of operation of the DES algorithm. Decrypted software is placed in a user RAM 14 for later use by the processor 13. The software in the ROM 12 may contain an instruction which checks that a date held in a clock 15 has not been passed so that in this way software can be leased for a limted period only.

The RAM 11, the ROM 12 and the clock 15 are addressed and pass their contents out by way of a decoder 19 and an address, data and control bus 19'.

The processor 13 operates in two modes: a decode mode in which the RAM 11, the ROM 12 and the clock 15 are available to the processor in addition to the user RAM 14 and a shared ROM 16 containing general code for use in running the processor; and an operating mode in which the use of the RAM 11, the ROM 12 and the clock 15 is denied to the processor by means of a switch/reset circuit 17.

Figure 2:
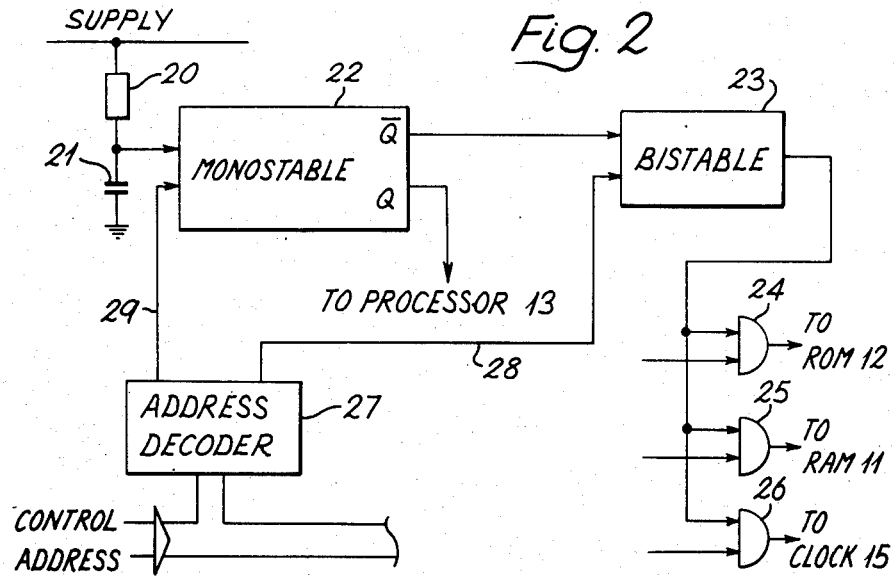
FIG. 2 is a block diagram of a switch/reset circuit used in the apparauts of FIG. 1.

FIG. 2 shows a block diagram of the switch/reset circuit 17 and comprises a resistor 20 connected in series with a capacitor 21 between a supply and earth. When a main power supply of the SPD is switched on so that a program can be run, the capacitor 21 charges by way of the resistor 20 and in so doing applies a rising edge to fire a monostable circuit 22 by way of an internal Schmitt trigger input. The Q output of the monostable circuit 22 is used to reset the processor 13 and the $\overline{Q}$ output causes a bisable circuit 23 to enter a state in which its output enables three AND gates 24, 25 and 26. These gates form part of the decoder 19 and are used to enable the ROM 12, the RAM 11 and the clock 15 respectively, so that they can be addressed. The other inputs of these gates are enabled by the processor 13 when such addressing is to take place.

Thus after switching on the SPD the ROM 12, the RAM 11 and the clock 15 are available to the processor. When the reset signal from the Q output of the monostable 22 occurs it causes the processor to start execution from a predetermined address in the ROM 12. When the software contained by the ROM 12 has been run and any required decryption of DES keys and its encrypted software has been carried out the software held by the ROM 12 informs the host computer 30 that decryption has been completed but at the same time addresses a decoder 27 which causes a signal to be applied by way of a connection 28 to the bistable 23 causing it to enter its other state in which the gates 24, 25 and 26 are no longer enabled. Thus mode 2 is entered and access to the ROM 12, the RAM 11 and the clock 15 is barred.

Mode 1 can only be entered by switching the SPD off and then on again so that the process described above is repeated, or by writing an appropriate code to the decoder 27 when an output appears on line 29 which causes the monostable circuit 22 to provide a pulse which returns the bistable 23 to the state in which it enables the gates 24, 25 and 26. However when this occurs the Q output of the monostable 22 resets the processor 13 so that it runs through exeuction from the predetermined address and then hands over execution to the decrypted module after barring the RAM 11, the ROM 12 and the clock 15. Hence the processor 13 and the host computer 30 are never able to gain access to the RSA and DES keys, the software in the ROM 12 or the clock 15 when they are under control of software provided by a user.

When an encrypted module is to be used it is loaded into the host computer 30 and then by way of a serial interface 18 into the user RAM 14. Alternatively if the SPD is an integral part of the host computer 30, the encrypted module is loaded via a suitable ous interface. At this time the SPD 10 will, regardless of interface, be in its first mode or the host computer 30 will cause it to enter this mode. The encrypted DES key is taken from the user RAM, decrypted and placed in one of a number of slots allocated for such keys in the RAM 11 and then the encrypted software is decrypted and the resultant code is placed in the user RAM 14. When it is required to use it is run on the processor 13 either in parallel with or in series with software in the host computer 30.

Where several encrypted modules are likely to be run frequently the encrypted DES key for each module may be entered into the SPD 10, decrypted and stored in the RAM 11 so that when a module is to be run only the encrypted code has to be decrypted not the key. At present it can take some considerable time to use the RSA algorithm to decode the DES keys. The processor 13 stores a list of the modules whose DES keys have been decrypted and the slots in which these keys are stored so that when a module is required it is loaded by the host computer 30 into the RAM 14 when decryption immediately takes place using the correct DES key from the appropriate slot and the decrypted version replaces the encrypted version in the RAM 14.

It is envisaged that software dealers will stock software products for sale or lease each comprising plane text and encrypted modules. For each product, the DES key of the encrypted module is encrypted by the RSA algorithm using the buyer's public-key. When a buyer makes a request for sale he will quote his public-key and the dealer will check that that key has been issued by a key licensing authority. The licensing authority will authorise the creation of pairs of public and secret keys and will issue the secret keys to manufacturers for entry into SPDs during manufacture. Alternatively, the authority may enter them into finished SPDs to be sold or leased. This scheme counters a "fake SPD attack" in which a buyer creates his own pair of secret and public-keys quoting the public-key to the dealer. If the dealer does not check that the licensing authority has issued the public-key then he may sell software which the buyer is able to decode using the 'secret' key known to him. The buyer can then use the software as much as he wishes and also pass it to other users. Under the licensing authority arrangement the buyer does not known his own secret key since it is sealed in his SPD and therefore he cannot gain accsss to the decrypted software and DES key.

The tamper-resistant housing of the SPD (not shown) may include a plurality of detectors arranged in layers, each detector being designed to sense a particular mechanical, electrical or electromagnetic attack. When tripped each detector triggers an alarm and a sequence of instructions for erasing sensitive information from the RAM 11. In one method capacitors of the RAM require periodic recharging to maintain the memory image. This process is termed "refreshing". Should an attack be detected the refreshing procedure is interrupted and the sensitive information lost. A variation of this approach is to erase information by overwriting the RAM with random numbers in a very short time following an interruption of the power supply.

In general the detectors are arranged in layers. The first is merely designed to deter the curious and the second and third are designed to deter a determined intruder. The first layer detector may comprise casing plates bolted or glued together and the detector senses attempts to separate the plates. Further description of tamper-resistant consturction is given in a thesis "Protecting externally applied software in small computers" by S. T. Kent, MIT September 1980, MIT/LCS-TR-255.

It will be clear that the invention can be put into practice in many different ways from those specifically mentioned. The tamper-resistant housing must contain a mode switch protecting the RSA and DES keys, or equivalent, from access by the host computer. The switch itself, a store for the keys and the processor must also be protected by the tamper-resistant housing. The switch may, of course, have many different forms other than that specifically described above.

The invention also includes methods which correspond to the apparatus of the invention and the methods mentioned for making software available, preparing and issuing public and secret keys, and entering keys into SPDs.

We claim:

1. Apparatus for use in protecting wherein the software is independent of the operating system of a host computer comprising first storage means adapted to contain at least one decryption key, second storage means containing instructions for decrypting another key using a key held in the first storage means and for decrypting encrypted software using the said other key, a processor for carrying out the instructions held by the second storage means, and switch means having first and second modes in which the first storage means are, and are not, in communication with the processor, respectively, the switch means being constructed to enter its first mode automatically under predetermined conditions and while in this first mode to cause the processor to execute a sequence of the instructions held in the second storage means which end with an instruction which causes the switch means to enter its second mode, the first and second storage means, the processor and the switch means being contained in a tamper resistant housing, and the apparatus including an interface constructed to allow the processor to communicate with other apparatus external to the housing.

2. Apparatus according to claim 1 wherein said second storage means are, and are not, in communication with said processor in the first and second modes of said switch means respectively.

3. Apparatus according to claim 2 wherein said tamper-resistant housing contains
   third storage means for storing decrypted software, and
   fourth storage means containing instructions to operate the procssor in the first and second modes of said switch means.

4. Apparatus according to claim 1 wherein the first storage means are random access memory and second storage means are read only memory.

5. Apparatus according to claim 1 wherein the tamper-resistant housing contains a clock and the processor is arranged to operate correctly only if the encrypted software supplied to the apparatus contains a date having a predetermined relationship with the current clock indication.

6. Apparatus according to claim 1 wherein the apparatus is so constructed that it is independent of the operating system of any computer used with the apparatus.

7. Method for use in protecting wherein the software is independent of the operating system of a host computer comprising the steps of
   passing encrypted software from a host computer to third storage means contained in a tamper-resistant housing;
   decrypting the encrypted software using at least one decryption key contained in first storage means, instructions contained in second storage means and a processor, the first storage means second storage means and the processor being contained in the tamper-resistant housing;
   isolating the first storage means from the processor automatically under predetermined conditions, and
   executing the decrypted software on the processor under control of the host computer.

8. Method according to claim 7 wherein protected software comprises at least one plaintext module and at least one encrypted module, the encrypted module being decrypted and run inside the tamper-resistant housing and the plaintext module being run on the host computer.

9. Method according to claim 7 wherein the encrypted software is independent of the operating system of the host computer.

10. Method according to claim 7 wherein the said automatic isolation is carried out once decryption of the encrypted software is completed.

11. Method according to claim 10 wherein the second storage means are also automatically isolated from the processor once decryption of the encrypted software is completed.

12. Method according to claim 7 wherein decryption of encrypted software comprises decryption of a DES key using an RSA key stored in the first storage means and an RSA algorithm stored in the second storage means:
   storing the decrypted DES key in the first storage means,
   decryption of encrypted software using the decrypted DES key and a DES algorithm stored in the second storage means, and
   passing the decrypted software to the third storage means.

* * * * *

UNITED STATES PATENT AND TRADEMARK OFFICE
CERTIFICATE OF CORRECTION

PATENT NO. : 4,634,807

DATED : Jan. 6, 1987

INVENTOR(S) : CHORLEY, et al.

It is certified that error appears in the above-identified patent and that said Letters Patent is hereby corrected as shown below:

In the Claims:

Claim 1, line 1, after "for use in protecting" insert -- software --.

Claim 7, line 1, after "for use in protecting" insert -- software --.

Signed and Sealed this

Twenty-seventh Day of December, 1988

Attest:

DONALD J. QUIGG

*Attesting Officer*  *Commissioner of Patents and Trademarks*